(12) United States Patent
Kim et al.

(10) Patent No.: US 8,411,605 B2
(45) Date of Patent: Apr. 2, 2013

(54) METHOD AND APPARATUS FOR DISCONTINUOUSLY RECEIVING PACKET IN A MOBILE COMMUNICATION SYSTEM

(75) Inventors: Soeng-Hun Kim, Suwon-si (KR); Kyeong-In Jeong, Hwaseong-si (KR); Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 1685 days.

(21) Appl. No.: 11/786,427

(22) Filed: Apr. 11, 2007

(65) Prior Publication Data

US 2012/0195240 A1 Aug. 2, 2012

(30) Foreign Application Priority Data

Apr. 11, 2006 (KR) .................. 10-2006-0032984
Aug. 31, 2006 (KR) .................. 10-2006-0083843

(51) Int. Cl.
*G08C 17/00* (2006.01)
*H04W 72/00* (2009.01)

(52) U.S. Cl. ...................... 370/311; 455/450

(58) Field of Classification Search .......... 370/310, 370/311, 329, 335, 336, 321, 328, 342, 345, 370/347, 348, 350, 351, 352, 353, 354, 355, 370/356, 395.2, 431, 464, 468, 470, 509; 455/450, 343.2, 343, 4, 574
See application file for complete search history.

(56) References Cited

U.S. PATENT DOCUMENTS

| | | | |
|---|---|---|---|
| 6,016,312 A | 1/2000 | Storm et al. | |
| 7,230,932 B2* | 6/2007 | Numminen | 370/311 |
| 7,680,071 B2* | 3/2010 | Bultan et al. | 370/311 |
| 7,844,265 B2* | 11/2010 | Kuchibhotla et al. | 455/423 |
| 8,023,475 B2 | 9/2011 | Goldberg et al. | |
| 2003/0109268 A1 | 6/2003 | Fraser et al. | |
| 2004/0076137 A1 | 4/2004 | Seurre et al. | |

(Continued)

FOREIGN PATENT DOCUMENTS

| | | |
|---|---|---|
| EP | 1 317 156 | 11/2001 |
| EP | 1 337 048 | 8/2003 |

(Continued)

OTHER PUBLICATIONS

Cisco, Voice Over IP—Per Call Bandwidth Consumption, Feb. 2, 2006, www.cisco.com, Document ID:7934.*

(Continued)

*Primary Examiner* — George Eng
*Assistant Examiner* — Hung Du
(74) *Attorney, Agent, or Firm* — The Farrell Law Firm, P.C.

(57) ABSTRACT

A method for receiving a packet by a terminal in a mobile communication system including a base station providing a packet, and a terminal that discontinuously receives a packet from the base station in Discontinuous Reception (DRX) cycles each having an active period and a sleep period. The packet reception method includes receiving, from the base station, configuration information for a DRX service, including a DRX cycle length; setting, as a starting point of the DRX cycle, a point at which a first packet is received from the base station; receiving a packet from the base station for an active period at the beginning of the starting point; and transitioning to a sleep period and waiting for a next active period.

18 Claims, 8 Drawing Sheets

U.S. PATENT DOCUMENTS

| | | | |
|---|---|---|---|
| 2004/0100940 | A1 | 5/2004 | Kuure et al. |
| 2004/0127221 | A1 | 7/2004 | Takano et al. |
| 2004/0198411 | A1 | 10/2004 | Cheng et al. |
| 2005/0032555 | A1* | 2/2005 | Jami et al. .................... 455/574 |
| 2005/0153751 | A1 | 7/2005 | Bultan et al. |
| 2006/0029011 | A1 | 2/2006 | Etemad et al. |
| 2006/0030305 | A1 | 2/2006 | Lee et al. |
| 2009/0305711 | A1* | 12/2009 | Rinne et al. .................. 455/450 |

FOREIGN PATENT DOCUMENTS

| | | |
|---|---|---|
| EP | 1 499 144 | 1/2005 |
| JP | 2004-147050 | 5/2004 |
| JP | 2006-025463 | 1/2006 |
| RU | 2 195 075 | 12/2002 |
| WO | WO 2005/086383 | 9/2005 |
| WO | WO 2006/019267 | 2/2006 |

OTHER PUBLICATIONS

Cisco, Voice Over IP—Per Call Bandwidth Consumption, Feb. 2, 2006, www.cisco.com.*

"Part 16: Air Interface for Fixed and Mobile Broadband Wireless Access Systems", Feb. 28, 2006.

"Part 11: Wireless LAN Medium Access Control (MAC) and Physical Layer (PHY) Specifications", Aug. 1, 2005.

Yeongmoon Son et al., IEEE 802.16 Broadband Wireless Access Working Group, "Sleep Mode Supporting the Periodic Ranging with Compressed Format of SLP ID fields in MOB_TRF-IND Message—Harmonization Ad-Hoc Consensus Contribution", Aug. 17, 2004.

* cited by examiner

METHOD AND APPARATUS FOR DISCONTINUOUSLY RECEIVING PACKET IN A MOBILE COMMUNICATION SYSTEM

PRIORITY

This application claims priority under 35 U.S.C. §119(a) to a Korean Patent Application filed in the Korean Intellectual Property Office on Apr. 11, 2006 and assigned Serial No. 2006-32984, and a Korean Patent Application filed in the Korean Intellectual Property Office on Aug. 31, 2006 and assigned Serial No. 2006-83843, the disclosures of each of which are incorporated herein by reference.

BACKGROUND OF THE INVENTION

1. Field of the Invention

The present invention relates generally to a mobile communication system using a Discontinuous Reception (DRX) mode, and in particular, to a method and apparatus for discontinuously receiving packets.

2. Description of the Related Art

Long Term Evolution (LTE), being discussed in $3^{rd}$ Generation Partnership Project (3GPP) in charge of standardization of Universal Mobile Telecommunication Service (UMTS) systems, is technology for implementing high-speed packet based communication at some 100 Mbps. Several schemes currently under discussion include reducing the number of nodes located in a communication path by simplifying the network configuration, and maximally approximating wireless protocols to wireless channels. As a result, it is expected that the LTE configuration will change from the existing 4-node configuration to a 2-node or 3-node configuration. For example, as shown in FIG. 1, the LTE configuration can be simplified to a 2-node configuration of an Evolved Node B (ENB) and an Evolved Gateway GPRS (General Packet Radio Service) Serving Node (EGGSN).

Figure 1:
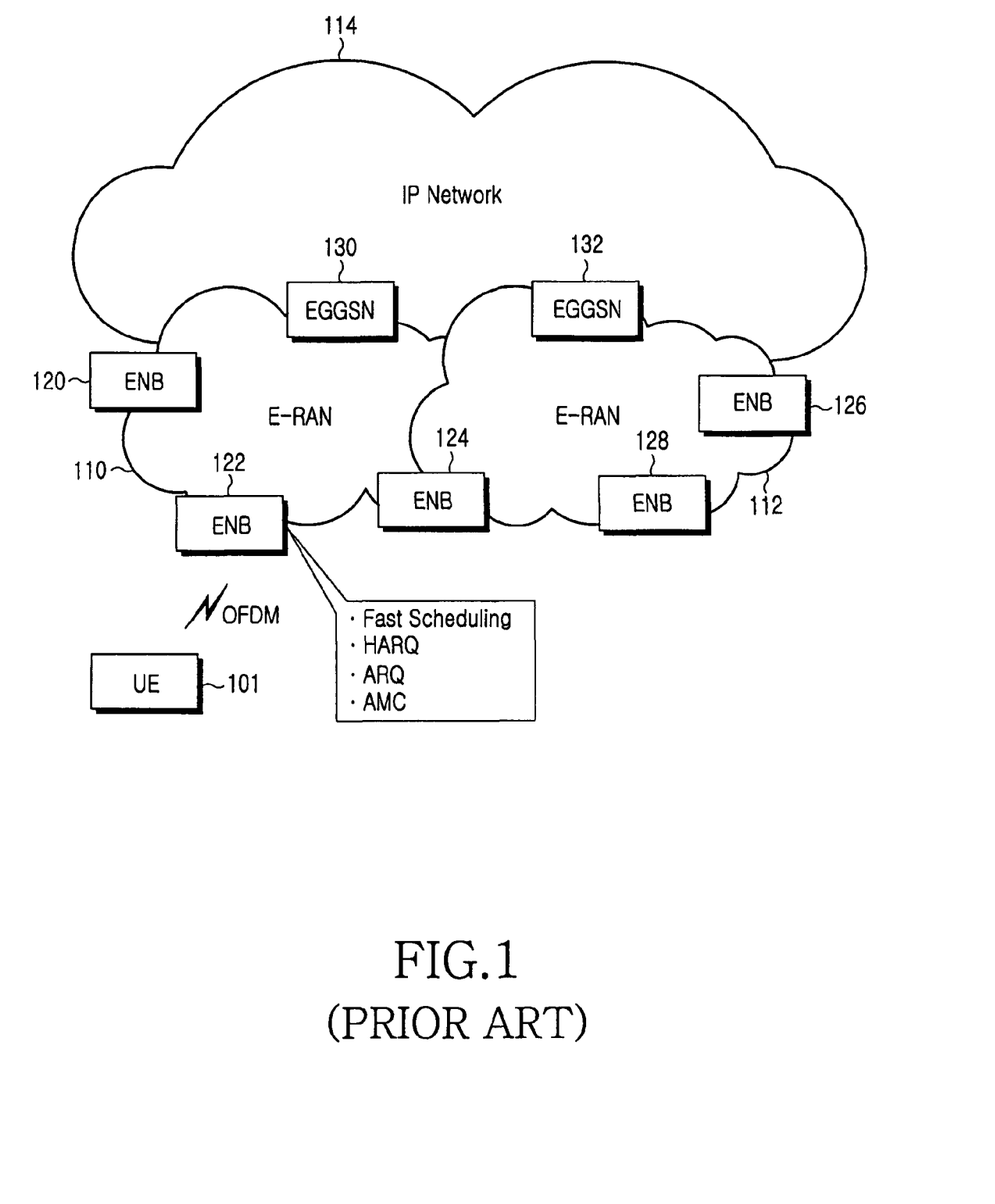
FIG. 1 is a diagram of a general LTE system.

FIG. 1 shows a general LTE system. A configuration of Evolved Radio Access Networks (E-RANs) 110 and 112 is simplified to a 2-node configuration of Evolved Node Bs (ENBs) 120, 122, 124, 126 and 128, and Evolved Gateway GPRS Serving Nodes (EGGSNs) 130 and 132. A User Equipment (UE) 101 accesses an Internet Protocol (IP) network 114 via the E-RANs 110 and 112.

The ENBs 120, 122, 124, 126 and 128, nodes corresponding to the existing Node Bs, are connected to the UE 101 over a wireless channel. Compared with the existing Node Bs, the ENBs 120, 122, 124, 126 and 128 perform a more complex function. In LTE, all user traffics including real-time services such as Voice over IP (VoIP) will be serviced over a shared channel. This means that there is a need for an apparatus of collecting status information of UEs 101 and performing scheduling depending thereon, and the scheduling is managed by the ENBs.

Like High Speed Downlink Packet Access (HSDPA) or Enhanced Dedicated Channel (EDCH), LTE also performs Hybrid Automatic Repeat reQuest (HARQ) between the ENBs 120, 122, 124, 126 and 128, and the UE 101. HARQ is a technique for soft-combining previously received data with retransmitted data without discarding the previously received data, thereby increasing reception success rate. However, with use of only the HARQ, the LTE system cannot meet various Quality of Service (QoS) conditions. Therefore, separate Automatic Repeat reQuest (ARQ) (i.e. outer-ARQ) can be performed in an upper layer, and the separate ARQ is also performed between the UE and the ENB. It is expected that LTE will use Orthogonal Frequency Division Multiplexing (OFDM) as wireless access technology in a 20-Mhz bandwidth in order to realize a data rate of a maximum of 100 Mbps. In addition, an Adaptive Modulation & Coding (AMC) scheme of determining a modulation scheme and a channel coding rate according to channel status of terminals will be applied to LTE.

Generally, a DRX mode is used for increasing a waiting time of a terminal in an idle state. That is, the terminal repeats an operation of waking up from a sleep mode for paging at a particular time, monitoring a specific channel for a specific period, and then returning back to the sleep mode. DRX in the general mobile communication system will now be described with reference to FIG. 2.

Figure 2:
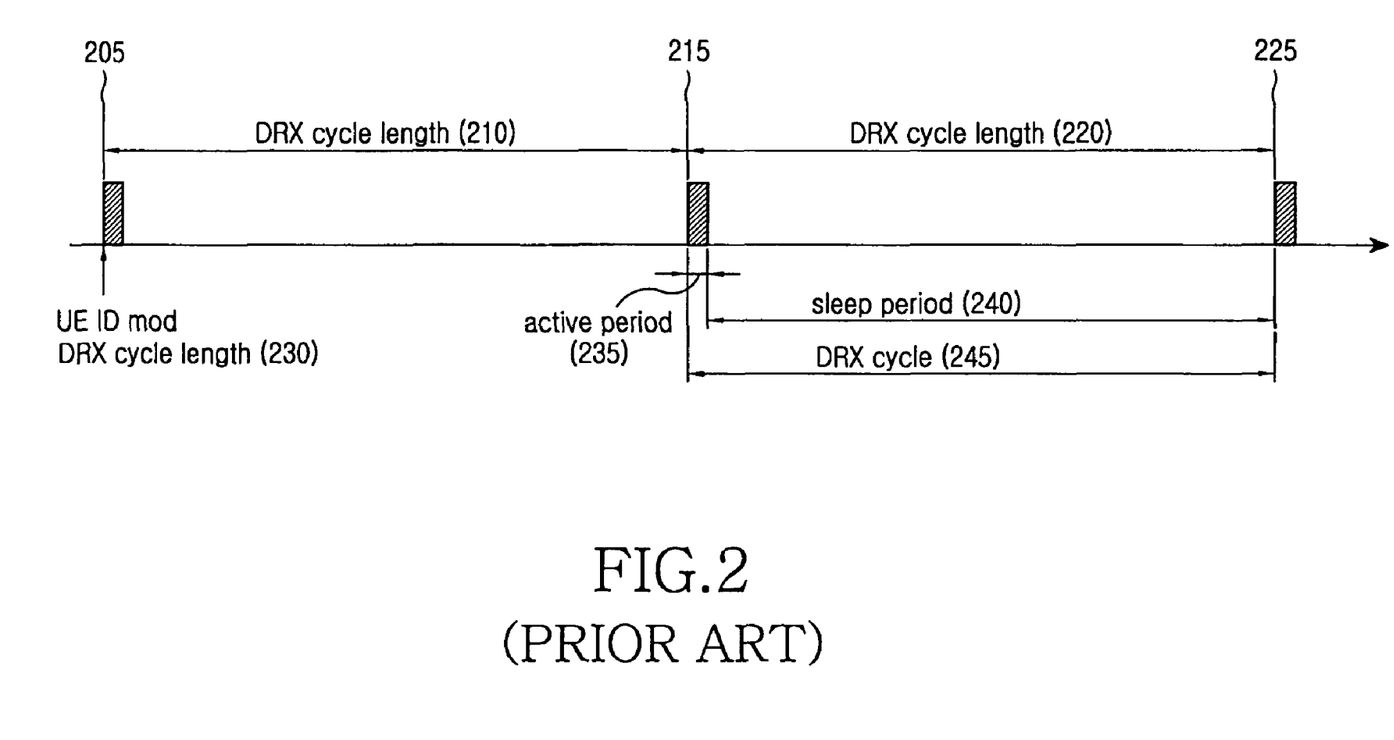
FIG. 2 is a diagram of a DRX operation in a general mobile communication system.

Referring to FIG. 2, a terminal (or UE) and a base station (or Node B) previously agree on a DRX configuration and repeat a sleep period 240 and an active period 235 according to the DRX configuration. The sleep period 240 means a period in which the terminal turns off its receiver to minimize power consumption, and the active period 235 means a period in which the terminal turns on its receiver to perform a normal reception operation. The active period 235 is also known as a wake-up period, and the terms 'active period' and 'wake-up period' are used as a synonym throughout the specification.

DRX is possible as a terminal and a base station recognize DRX cycles. A DRX cycle 245 includes the active period 235 and the sleep period 240. In one DRX cycle, the active period precedes the sleep period, and the DRX cycle is prescribed by the following factors.

DRX cycle lengths 210 and 220 mean a distance between consecutive active periods. Because the DRX cycle 245 starts with the active period 235, the DRX cycle lengths 210 and 220 mean the distance between the consecutive active periods. An increase in the DRX cycle lengths 210 and 220 contributes to an increase in the sleep period 240 and a reduction in power consumption of the terminal. However, the increase in the DRX cycle length inevitably increases a paging delay for the terminal. The DRX cycle length is signaled by a network.

A starting point (or starting position) of the DRX cycle is a starting point of the active period 235, and is generally induced from a unique identifier of a terminal and a DRX cycle length. For example, a value obtained by performing a modular or mod operation on the identifier of the terminal with the DRX cycle length can be used as the starting point of the DRX cycle. In FIG. 2, the starting point of the DRX cycle can be the points 205, 215 and 225.

A length of the active period 235 is a length of a period in which the terminal wakes up for one active period, and a particular value is generally used as the length of the active period 235. For example, in the UMTS communication system, the length of the active period is 10 msec.

A length of the sleep period 240 is a length of the other period excepting the active period 235 from the DRX cycle 245.

The terminal calculates a starting point of the DRX cycle using its own identifier and the DRX cycle length (see 230), and receives a downlink signal at the DRX cycle starting point for the active period. If there is no desired information in the received downlink signal, the terminal turns off its receiver and enters the sleep period.

In LTE, a scheme of introducing DRX even for a terminal in a connected state is under discussion, and it would be obvious to those skilled in the art that DRX for a connected state terminal should be configured taking into account a characteristic of an ongoing service.

However, a conventional DRX that periodically wakes up and monitors a certain channel for a specific period is unsuitable for a connected state terminal. For example, for a VoIP service which is susceptible to delay, a previous determination of a DRX starting point may cause degradation of a service quality. The reasons will be described with reference to FIG. 3.

Figure 3:
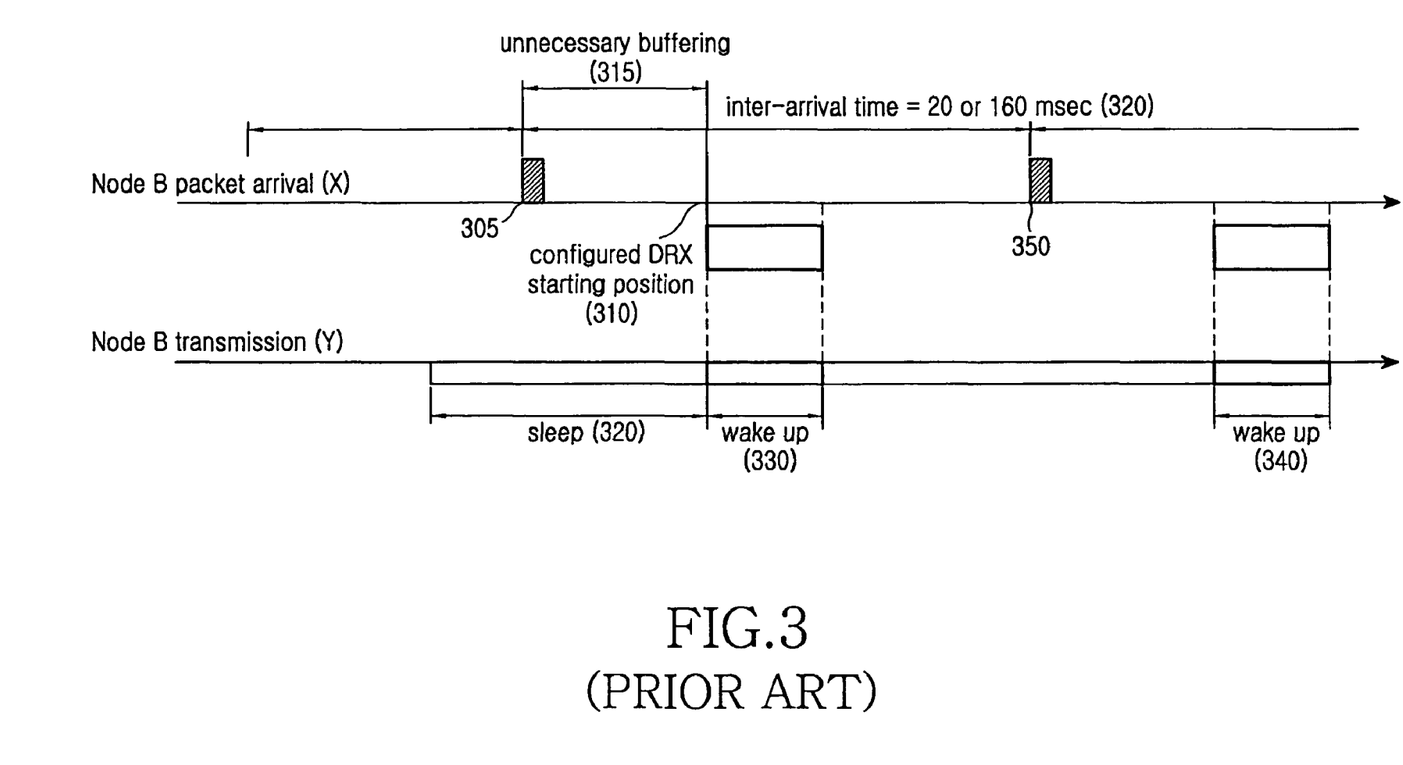
FIG. 3 is a diagram of a conventional DRX operation of a terminal.

FIG. 3 shows a conventional DRX operation of a terminal, applied in a LTE system. Specifically, FIG. 3 shows a timing diagram for a packet received from a Node B, and a timing diagram for a DRX cycle of a terminal. When a starting point of the DRX cycle is determined based on static information, such as an identifier of the terminal, in a conventional manner, the starting point of the DRX cycle is determined regardless of the time that data arrives at the Node B.

Specifically, when a VoIP packet arrives at the Node B at an arbitrary time 305, the VoIP packet cannot be transmitted until the next active period 330 starts. Therefore, the Node B buffers the VoIP packet until a starting point 310 of the next active period 330. As a result, the transmission delay increases as much as the buffering time 315.

Downlink VoIP packets, as they are transmitted over wire/wireless networks, may arrive at the base station with some jitter. However, according to a characteristic of the VoIP service, an inter-arrival time of a VoIP packet is generally 20 msec or 160 msec without great error. Therefore, for a service which is susceptible to delay and has a substantially constant inter-arrival time, such as a VoIP service, a conventional DRX reception operation increases in the transmission delay. Thus, there is a need for a new DRX reception operation.

SUMMARY OF THE INVENTION

The present invention addresses at least the above-described problems and/or disadvantages and provides at least the advantages described below. Accordingly, an aspect of the present invention is to provide a method and apparatus for efficiently receiving packets in a mobile communication system supporting a DRX mode.

Another aspect of the present invention is to provide a packet reception method and apparatus capable of reducing a transmission delay in a mobile communication system supporting a DRX mode.

Another aspect of the present invention is to provide a packet reception method and apparatus capable of preventing degradation of the service quality in a mobile communication system supporting a DRX mode.

According to an aspect of the present invention, there is provided a method for receiving a packet by a terminal in a mobile communication system including a base station providing a packet, and a terminal that discontinuously receives a packet from the base station in DRX cycles each having an active period and a sleep period. The packet reception method includes receiving, from the base station, configuration information for a DRX service, including a DRX cycle length; setting, as a starting point of the DRX cycle, a point at which a first packet is received from the base station; receiving a packet from the base station for an active period at a beginning of the starting point; and transitioning to a sleep period that has a starting point defined as an ending point of the active period and has an ending point which is spaced apart from a starting point of the active period by the DRX cycle length, and waiting for a next active period.

According to another aspect of the present invention, there is provided a method for receiving a packet by a terminal in a mobile communication system including a base station providing a packet, and a terminal that discontinuously receives a packet from the base station in DRX cycles each having an active period and a sleep period. The packet reception method includes receiving, from the base station, configuration information for a DRX service, including a DRX cycle length; determining whether the base station transmits a packet using a control message on a downlink control channel; setting, as a starting point of the DRX cycle, a point at which the first downlink control channel is received from the base station when it is determined that the base station transmits a packet; receiving the packet from the base station for an active period at the beginning of the starting point; and transitioning to a sleep period that has a starting point defined as an ending point of the active period and has an ending point which is spaced apart from a starting point of the active period by the DRX cycle length, and waiting for a next active period.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a method and apparatus for setting a starting point of an active period to an expected arrival time of a packet and discontinuously receiving the packet according thereto, for a specific service which is susceptible to delay and has a substantially constant inter-arrival time for a packet, such as a VoIP (Voice over Internet Protocol) service, in a mobile communication system including a base station that provides packets, and a terminal that discontinuously receives packets from the base station in Discontinuous Reception (DRX) cycles each including an active period and a sleep period, i.e. in a mobile communication system supporting DRX.

A description of the present invention will be made herein with reference to an LTE system, by way of example. However, it should be noted that the present invention can be applied to any mobile communication system supporting a specific service which is susceptible to a delay and has a substantially constant inter-arrival time for a packet, in addition to the LTE system.

According to one example of the present invention, a starting point of a DRX cycle for an arbitrary service is a point at which a first packet for the corresponding service is received. If a terminal receives the first packet for the corresponding service while continuously receiving a downlink channel, the terminal regards the reception point of the first packet as a starting point of the DRX cycle. Because the DRX cycle starts with an active period as described above, a starting point of the DRX cycle is equal to a starting point of the active period herein. The terminal regards, as a starting point of the next DRX cycle/active period, a point which is spaced apart from the identified starting point by a DRX cycle length.

The terminal receives a packet if the active period starts. After completion of receiving one packet, the terminal switches to and maintains a sleep mode until the next active period is started, considering that the active period has ended.

By defining a starting point of the active period as a reception point of the first packet, defining an ending point of the active period as a point at which one packet has been successfully received, and defining a starting point of the next active period as a point which is spaced apart from the starting point of the previous active period by the DRX cycle length, the terminal can maximize a length of a sleep period while minimizing delay added to reception of a packet, such as a VoIP packet.

Figure 4:
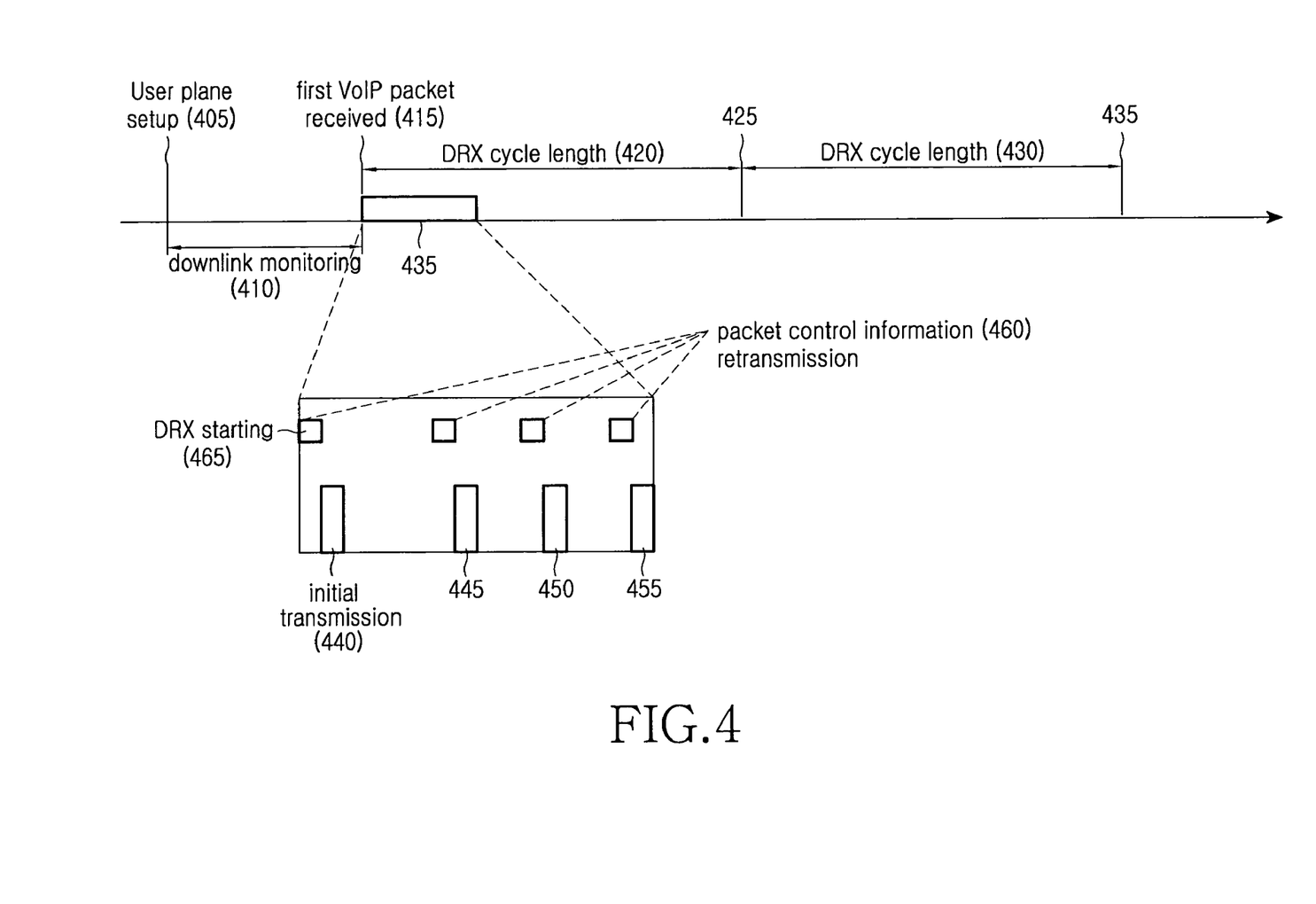
FIG. 4 is a diagram of DRX operation timing according to a first embodiment of the present invention.

FIG. 4 shows an example of timing for a DRX reception operation according to the present invention. To use DRX proposed in the present invention, a user plane is set up. The user plane setup is limited to setup for an arbitrary service which is susceptible to the delay and has a known inter-arrival time for traffic. Because the user plane setup is not related to the present invention, a description will be omitted. It is assumed herein that DRX is configured independently for each service.

Referring to FIG. 4, a terminal and a network (or base station) set up a user plane at a point 405 to exchange traffic of the service with the terminal. During the user plane setup, DRX cycle lengths 420 and 430 to be used for a DRX operation, and a number of packets to be transmitted for one DRX cycle are signaled to the terminal.

If the user plane is set up, the terminal continuously monitors a downlink shared control channel at a point 410 to find a starting point of the DRX cycle/active period for the traffic to be transmitted over the user plane.

A communication system in which a base station schedules transmission resources, like a Long Term Evolution (LTE) system, first transmits control information 460 necessary for packet decoding to the terminal before transmitting the packet to the terminal. The control information 460 is transmitted over a downlink shared control channel recognized by the terminal.

When the terminal receives the control information 460 at a point 415 and recognizes that there is a packet transmitted thereto over the downlink shared control channel, the terminal receives the packet over a downlink traffic channel. The packet reception is performed through a specific Hybrid Automatic Repeat reQuest (HART) process. In other words, upon receipt of a downlink initial transmission packet 440, the terminal checks presence/absence of an error in the packet, and sends a retransmission request to the base station in the presence of an error. The terminal soft-combines a packet 445 retransmitted by the base station with the previously received packet 440, checks whether there is any remaining error, and sends a retransmission request to the base station when there is a remaining error. The terminal repeats the foregoing process until there is no error in the packet.

The terminal, after successfully receiving the packet, checks whether the packet is a packet of a DRX service, and when the packet is a DRX service packet, the terminal recognizes a point 465 at which the control information 460 for the packet was first transmitted, as a starting point of an active period for the DRX service.

The base station and the terminal previously agree on a number of packets to be exchanged for one DRX cycles 420 and 430. For a common VoIP service, one packet is exchanged for one DRX cycle. Therefore, for a DRX-based VoIP service, the number of packets to be exchanged for one DRX cycle is 1. When the terminal successfully receives one packet for an active period 435, the terminal switches to and maintains the sleep mode until the next active period starts after the active period ends. A starting point of the next active period is a point 425 which is spaced apart from a starting point of the previous active period by the DRX cycle.

Figure 5:
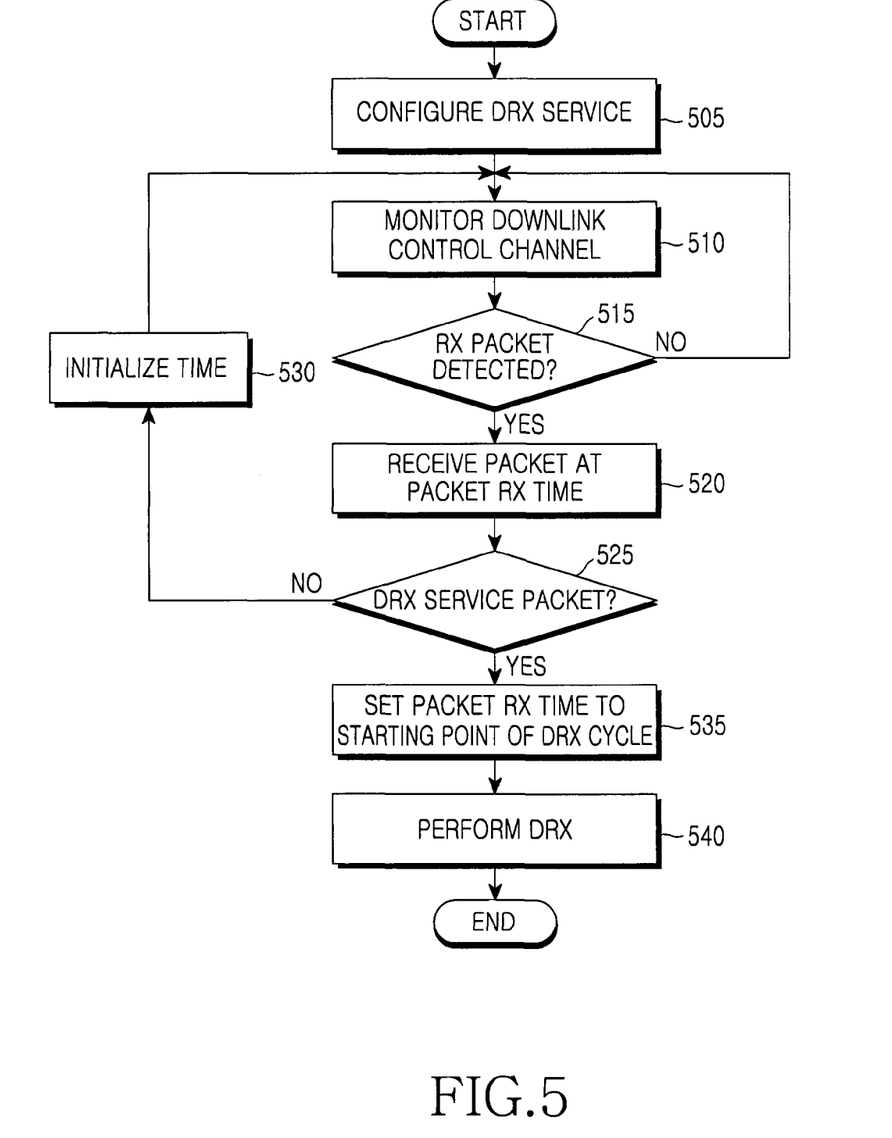
FIG. 5 is a diagram of a DRX reception operation according to the first embodiment of the present invention.

FIG. 5 shows an example of a DRX reception operation according to the present invention. A terminal receives, in step 505, DRX configuration information for an arbitrary service, signaled from a base station. The DRX configuration information includes a DRX cycle length, a number of packets to be received per DRX cycle, and the like. The terminal monitors in step 510 a downlink shared control channel until a packet transmitted thereto occurs.

The terminal determines in step 515 whether there is any packet transmitted thereto in the course of monitoring control information on the downlink shared control channel. Upon detecting a packet transmitted thereto by checking the control information, the terminal stores in step 520 a reception time of the downlink shared control channel, and then receives a packet at a packet reception time allocated thereto by performing a specific HARQ operation. However, when it is determined in step 515 that there is no packet allocated thereto, the terminal returns to step 510 where it continues to monitor the downlink shared control channel.

The terminal determines in step 525 whether the received packet is a DRX service packet. When the received packet is not a DRX service packet, the terminal initializes in step 530 the stored reception time of the downlink shared control channel, and then returns to step 510 where it continues to monitor the downlink shared control channel.

However, when the received packet is a DRX service packet, the terminal recognizes in step 535 the stored reception time of the downlink shared control channel as a starting point of the DRX cycle, and then proceeds to step 540 where it performs a DRX operation. That is, the terminal starts an active period based on the starting point of the DRX cycle, recognized in step 535, transitions to the sleep mode after receiving as many packets as the agreed upon number of packets to be received per DRX cycle for the active period, and waits until the next active period starts. The starting point of the next active period is a point which is spaced apart from a starting point of the previous active period (or a starting point of the DRX cycle) by the DRX cycle length.

Figure 6:
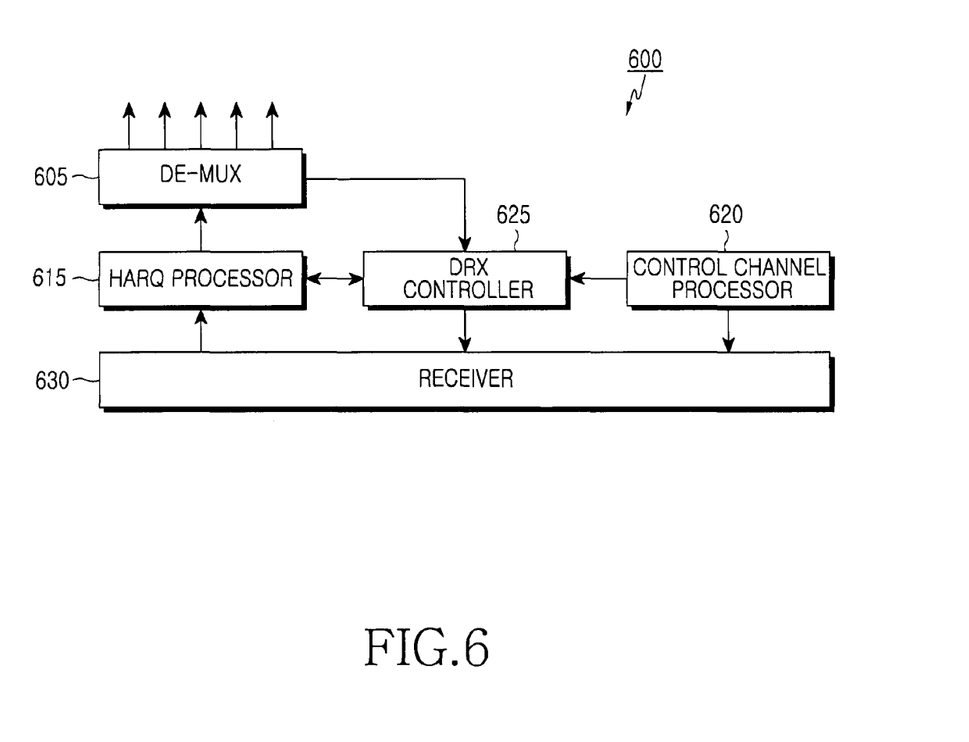
FIG. 6 is a block diagram of a terminal apparatus for performing a DRX operation according to the first embodiment of the present invention.

FIG. 6 shows an example of a terminal apparatus for performing a DRX reception operation according to the present invention. The DRX reception apparatus can also be applied to the DRX reception operations shown in FIGS. 7 and 8. A terminal 600 includes a demultiplexer (DE-MUX) 605, an HARQ processor 615, a receiver 630, a DRX controller 625, and a control channel processor 620.

The receiver 630 receives a control packet and a data packet from a base station over downlink shared control channel and traffic channel, and sends them to the control channel processor 620 and the HARQ processor 615, respectively. The receiver 630, under the control of the DRX controller 625, is turned on/off according to present/absence of a packet transmitted thereto.

The control channel processor 620 processes control information received over the downlink shared control channel. Further, the control channel processor 620 sends to the DRX controller 625, reception time information of the control information being delivered to the terminal.

The HARQ processor 615 processes an HARQ packet that the receiver 630 receives using a specific HARQ operation, and delivers an error-free HARQ packet to the demultiplexer 605.

The demultiplexer 605 reports demultiplexing information of the received HARQ packet to the DRX controller 625. The demultiplexing information is an identifier for an upper layer to which the packet will be delivered, and because one identifier is allocated per service, the DRX controller 625 can identify a service to which the corresponding packet belongs, using the demultiplexing information.

The DRX controller 625 turns off the receiver 630 in a sleep period, and turns on the receiver 630 in an active period. The DRX controller 625 recognizes a starting point of the DRX cycle using the demultiplexing information of the packet, received from the demultiplexer 605, and reception time information of the control information for the packet, received from the control channel processor 620. That is, the DRX controller 625 counts the number of packets received for the active period using the demultiplexing information delivered by the demultiplexer 605, and controls on/off of the receiver 630 upon recognizing an ending point of the active period.

Another example of the present invention will now be described that relates to a DRX reception operation performed in a terminal when persistent transmission resources or persistent resources are used for the VoIP service. A persistent transmission resource, as used herein, refers to a specific transmission resource that can be used for a terminal at stated periods. When a persistent transmission resource is allocated to a terminal, a base station has an advantage of not having to continuously transmit transmission resource information over a downlink shared control channel. This example of the present invention provides a method of defining, as a starting point of the DRX cycle, a point at which a persistent transmission resource is first allocated.

Figure 7:
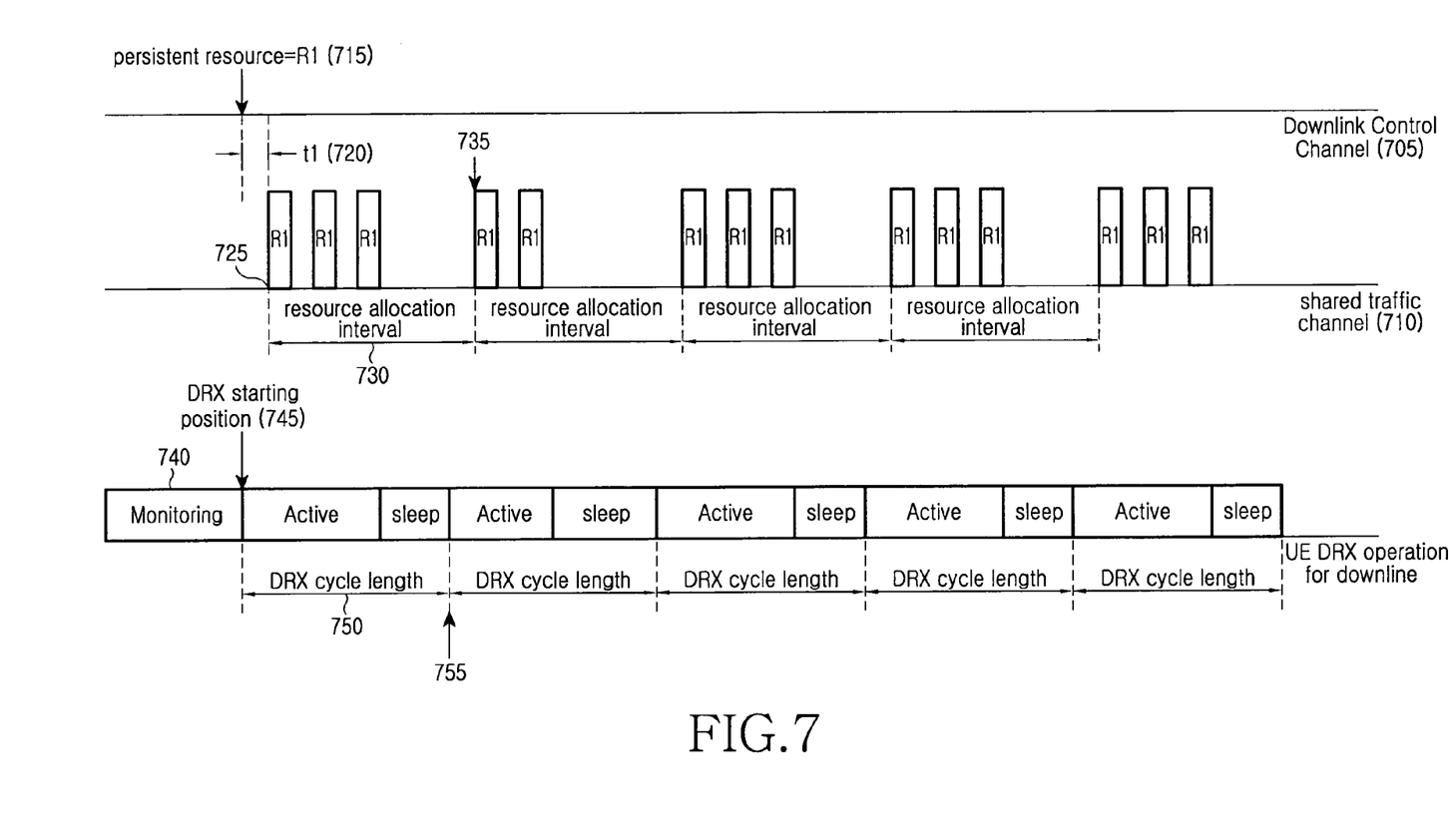
FIG. 7 is a diagram of DRX operation timing according to a second embodiment of the present invention.

FIG. 7 shows a timing diagram for a DRX reception operation according to the second embodiment of the present invention. A persistent transmission resource is allocated to a terminal over a downlink control channel 705. For example, when an arbitrary transmission resource R1 is persistently allocated to the terminal at a point 715, the terminal transmits one packet every transmission resource allocation period through a specific HARQ process using the transmission resource R1. There is a time difference t1 720 between a point 715 at which a transmission resource allocation signal is received, and a point 725 at which the terminal uses the transmission resource, to allow the terminal to analyze the transmission resource allocation signal. The t1 720, a fixed value, is previously recognized by the terminal.

When the VoIP service is provided using the persistent transmission resource, the terminal monitors the downlink control channel 705 for a period 740 until the persistent transmission resource is allocated, and starts an active period of the DRX cycle at a point 745 at which the persistent transmission resource is allocated. The next active period starts at a point 755 after a DRX cycle length 750 has elapsed from the starting point 745 of the active period.

The terminal monitors the downlink control channel 705 at the starting points 745 and 755 of the active period to check whether there is any change in the persistent transmission resource. If there is no change in the persistent transmission resource, the terminal processes a VoIP packet using the existing persistent transmission resource. After completion of the VoIP packet processing, the terminal transitions to and maintains the sleep mode until a starting point of the next active period. However, when there is a change in the persistent transmission resource, the terminal processes the VoIP packet using a new persistent transmission resource. After completion of the VoIP packet processing, the terminal transitions to and maintains the sleep mode until the starting point of the next active period.

For the downlink, the completion of VoIP packet processing means that the terminal successfully receives the VoIP packet through a specific HARQ process, or fails to receive the VoIP packet due to a limited maximum number of retransmissions. For the uplink, the completion of VoIP packet processing means that the terminal successfully transmits the VoIP packet through a specific HARQ process, or fails to transmit the VoIP packet due to the limited maximum number of retransmissions.

Figure 8:
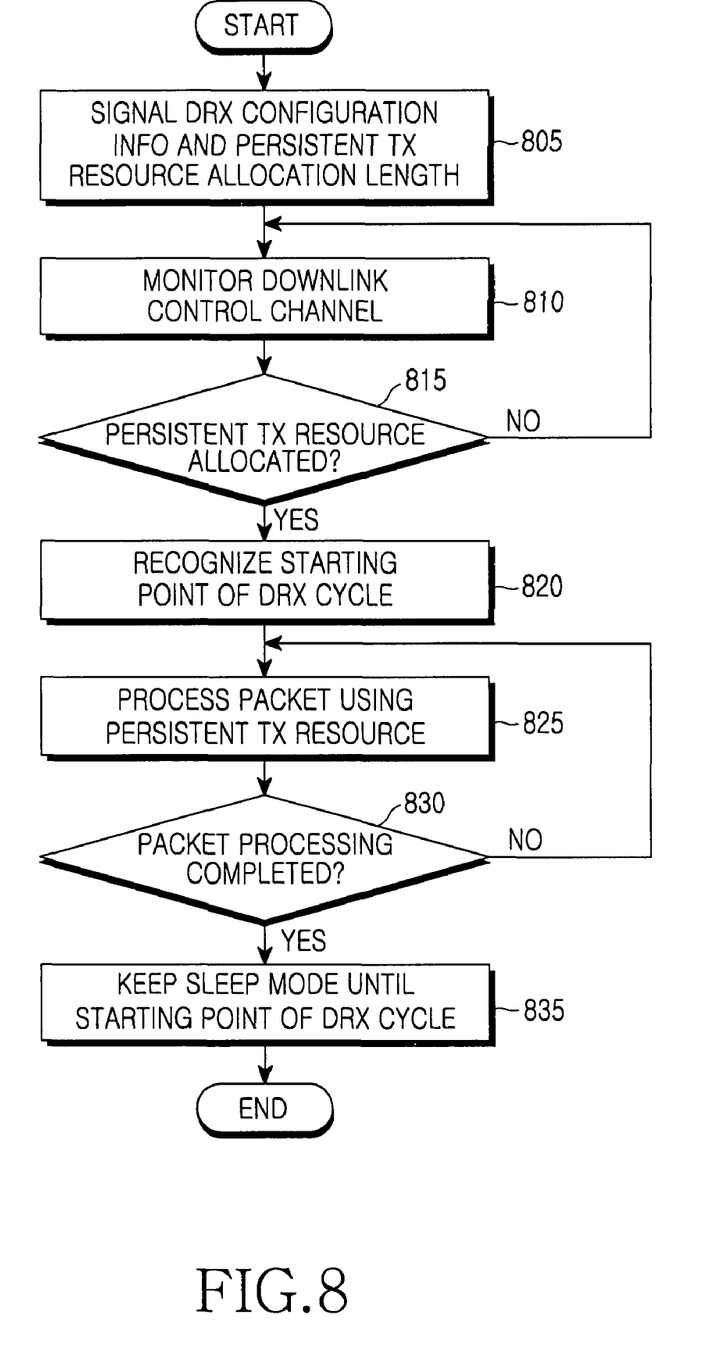
FIG. 8 is a diagram of a DRX operation according to the second embodiment of the present invention.

FIG. 8 shows another example of a DRX reception operation of a terminal according to the present invention. A terminal receives, in step 805, DRX configuration information for an arbitrary service, signaled from a base station. The service can be a VoIP service, and the DRX configuration information can include a DRX cycle length. When a persistent transmission resource is used for the service, length information of a transmission resource allocation period for the persistent transmission resource is also signaled together.

The terminal monitors in step 810 a downlink shared control channel until a persistent transmission resource is allocated thereto. When it is determined in step 815 that a persistent transmission resource is allocated thereto, the terminal proceeds to step 820 where it recognizes, as a starting point of a DRX cycle, the time at which the terminal has received a control message including the persistent transmission resource allocation information. That is, when the time at which the terminal has received a control message including the persistent transmission resource allocation information is defined as 't', the starting point of the DRX cycle is calculated using Equation (1).

$$DRX \text{ cycle starting point} = t + n \times DRX \text{ cycle length (for } n=0 \text{ or integer greater than 0)} \qquad (1)$$

In step 825, the terminal processes the packet using the allocated persistent transmission resource. When the persistent transmission resource is an uplink transmission resource, the terminal transmits the packet over the uplink using the persistent transmission resource. When the persistent transmission resource is a downlink transmission resource, the terminal receives the packet over the downlink using the persistent transmission resource.

Thereafter, the terminal determines in step 830 whether the packet processing is completed. When the packet processing using the persistent transmission resource is completed, the terminal proceeds to step 835 where the terminal transitions to and maintains a sleep mode until the next DRX cycle starting point.

The DRX reception operation according to this example of the present invention, shown in FIGS. 7 and 8, can be performed in the packet reception apparatus of the terminal shown in FIG. 6. Operations performed in the packet reception apparatus of the terminal shown in FIG. 6 will be summarized herein below.

For example, the receiver 630 receives, from a base station, configuration information for a DRX service, comprising a DRX cycle length. The DRX controller 625 sets, as a starting point of the DRX cycle, the point at which a first packet is received from the base station. In addition, the DRX controller 625 controls the receiver 630 to receive a packet from the base station for an active period at the beginning of the starting point. On the contrary, the DRX controller 625 controls the receiver 630 to wait for a next active period for a sleep period that has a starting point defined as an ending point of the active period and has an ending point which is spaced apart from a starting point of the active period by the DRX cycle length.

As another example, the receiver 630 receives, from the base station, configuration information for a DRX service, comprising a DRX cycle length. The control channel processor 620 determines whether the base station transmits a packet using a control message on the downlink control channel received by the receiver 630. When it is determined that the base station transmits a packet, the control channel processor 620 provides information on the time at which the first downlink control channel is received from the base station. The DRX controller 625 sets a starting point of the DRX cycle using the provided time information. In addition, the DRX controller 625 controls the receiver 630 so it receives a packet from the base station for an active period at the beginning of the starting point. On the contrary, the DRX controller 625 controls the receiver 630 to wait for a next active period for a sleep period that has a starting point defined as an ending point of the active period and has an ending point which is spaced apart from a starting point of the active period by the DRX cycle length.

In the foregoing examples, the configuration information for a DRX service can comprise a number of packets to be received per DRX cycle further. The DRX controller 625 can control transition from the active period to the sleep period at the ending point of the active period, which is determined when as many packets as a previously agreed to number of packets to be received per DRX cycle are received. The DRX controller 625 can set a starting point of the DRX cycle when the first packet received from the base station is a packet for the DRX service. The packet for the DRX service can be a packet for the VoIP service. The control message of the downlink control channel can comprise a persistent transmission resource allocation information. Further, the control message of the downlink control channel can comprise information of a transmission resource allocation period for the persistent transmission resource.

As can be understood from the foregoing description, a mobile communication system supporting the DRX mode according to the present invention sets an active period at a point at which a DRX packet is received, thereby preventing a delay due to the DRX cycle.

While the invention has been shown and described with reference to certain preferred embodiments thereof, it will be understood by those skilled in the art that various changes in form and details may be made therein without departing from the spirit and scope of the invention as defined by the appended claims. For example, although the present invention has been described herein with reference to the LTE system, the present invention can be applied to all mobile communication systems using a DRX reception operation without separate modification.

What is claimed is:

1. A method for receiving a packet by a terminal in a mobile communication system including a base station providing a packet, and the terminal that discontinuously receives a packet from the base station in Discontinuous Reception (DRX) cycles each including an active period and a sleep period, the method comprising:

receiving, from the base station, configuration information for a DRX service, including information on a DRX cycle length and information on a number of packets to be received in the DRX cycle;

setting, as a starting point of a DRX cycle, a point at which a first packet is received from the base station; and receiving a packet from the base station for an active period at the beginning of the starting point of the DRX cycle, wherein the active period is determined according to whether a number of received packets is equal to the number of packets to be received in the DRX cycle, and wherein the DRX service includes a service having a substantially constant inter-arrival time for a packet.

2. The method of claim 1, wherein the active period ends when the number of the received packets is equal to the number of packets to be received in the DRX cycle.

3. The method of claim 1, wherein setting the starting point of the DRX cycle comprises:

setting, as the starting point of the DRX cycle, the point at which the first packet is received from the base station, when the first packet received from the base station is a packet for the DRX service.

4. The method of claim 3, wherein the packet for the DRX service includes a packet for a Voice over Internet Protocol (VoIP) service.

5. The method of claim 1, wherein setting the starting point of the DRX cycle comprises:

setting a point at which control information for the first packet is received, as the starting point of the DRX service, when the control information for the first packet is received from the base station before the first packet is received.

6. An apparatus for receiving a packet by a terminal in a mobile communication system including a base station providing a packet, and the terminal that discontinuously receives a packet from the base station in Discontinuous Reception (DRX) cycles each including an active period and a sleep period, the apparatus comprising:

a receiver for receiving, from the base station, configuration information for a DRX service, including information on a DRX cycle length and information on a number of packets to be received in the DRX cycle; and a controller configured for:

setting, as a starting point of a DRX cycle, a point at which a first packet is received from the base station by the receiver;

controlling the receiver to receive a packet from the base station for an active period at the beginning of the starting point of the DRX cycle wherein the active period is determined according to whether a number of received packets is equal to the number of packets to be received in the DRX cycle, and wherein the DRX service includes a service having a substantially constant inter-arrival time for a packet.

7. The apparatus of claim 6, wherein the active period is ended when the number of the received packets is equal to the number of packets to be received in the DRX cycle.

8. The apparatus of claim 6, wherein the controller sets, as the starting point of the DRX cycle, the point at which the first packet is received from the base station, when the first packet received from the base station is a packet for the DRX service.

9. The apparatus of claim 8, wherein the packet for the DRX service includes a packet for a Voice over Internet Protocol (VoIP) service.

10. The apparatus of claim 6, wherein the controller sets a point at which control information for the first packet is received, as the starting point of the active period for the DRX service, when the control information for the first packet is received from the base station before the first packet is received.

11. A method for receiving a packet by a terminal in a mobile communication system including a base station providing a packet, and the terminal that discontinuously receives a packet from the base station in Discontinuous Reception (DRX) cycles each including an active period and a sleep period, the method comprising:

receiving configuration information for a DRX service, including information on a DRX cycle length and information on a number of packets to be received in the DRX cycle, and length information of a transmission resource allocation period for a persistent transmission resource;

determining whether persistent transmission resource allocation information is received from the base station for the transmission resource allocation period;

setting, as a starting point of a DRX cycle, a point at which the persistent transmission resource allocation information is received, when the persistent transmission resource allocation information is received; and performing one of transmission of a packet to the base station and reception of a packet from the base station, using a persistent transmission resource according to the persistent transmission resource allocation information, for an active period beginning from the starting point of the DRX cycle, wherein the active period is determined according to whether a number of received packets is equal to the number of packets to be received in the DRX cycle, and wherein the DRX service includes a service having a substantially constant inter-arrival time for a packet.

12. The method of claim 11, wherein performing one of transmission of the packet to the base station and reception of the packet from the base station comprises:

transmitting a packet to the base station using the persistent transmission resource according to the persistent transmission resource allocation information, when the persistent transmission resource according to the persistent transmission resource allocation information is an uplink transmission resource; and receiving a packet from the base station using the persistent transmission resource according to the persistent transmission resource allocation information, when the persistent transmission resource according to the persistent transmission resource allocation information is a downlink transmission resource.

13. The method of claim 11, wherein the DRX service includes a Voice over Internet Protocol (VoIP) service.

14. An apparatus for receiving a packet by a terminal in a mobile communication system including a base station providing a packet, and the terminal that discontinuously receives a packet from the base station in Discontinuous Reception (DRX) cycles each including an active period and a sleep period, the apparatus comprising:

a receiver for receiving configuration information for a DRX service, including information on a DRX cycle length and information on a number of packets to be received in the DRX cycle, and length information of a transmission resource allocation period for a persistent transmission resource;

a transmitter for transmitting a packet to the base station; and a controller configured for:

determining whether persistent transmission resource allocation information is received from the base station for the transmission resource allocation period;

setting, as a starting point of a DRX cycle, a point at which the persistent transmission resource allocation information is received, when the persistent transmission resource allocation information is received;

performing one of transmission of a packet to the base station and reception of a packet from the base station, using the persistent transmission resource according to the persistent transmission resource allocation information, for an active period beginning from the starting point of the DRX cycle, by controlling the receiver and the transmitter;

wherein the active period is determined according to whether a number of received packets is equal to the number of packets to be received in the DRX cycle, and wherein the DRX service includes a service having a substantially constant inter-arrival time for a packet.

15. The apparatus of claim 14, wherein the controller is further configured for:

controlling the transmitter to transmit a packet to the base station over an uplink using the persistent transmission resource according to the persistent transmission resource allocation information, when the persistent transmission resource according to the persistent transmission resource allocation information is an uplink transmission resource; and controlling the receiver to receive a packet from the base station over a downlink using the persistent transmission resource according to the persistent transmission resource allocation information, when the persistent transmission resource according to the persistent transmission resource allocation information is a downlink transmission resource.

16. The apparatus of claim 14, wherein the DRX service includes a Voice over Internet Protocol (VoIP) service.

17. The method of claim 11, wherein the active period ends when the number of the received packets is equal to the number of packets to be received in the DRX cycle.

18. The apparatus of claim 14, wherein the active period ends when the number of the received packets is equal to the number of packets to be received in the DRX cycle.

* * * * *